United States Patent
Li et al.

(10) Patent No.: US 11,570,169 B2
(45) Date of Patent: Jan. 31, 2023

(54) MULTI-FACTOR AUTHENTICATION VIA MULTIPLE DEVICES

(71) Applicant: International Business Machines Corporation, Armonk, NY (US)

(72) Inventors: Jenny S. Li, Cary, NC (US); Al Chakra, Apex, NC (US); Yu Deng, Yorktown Heights, NY (US); Theresa Tai, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 470 days.

(21) Appl. No.: 16/582,233

(22) Filed: Sep. 25, 2019

(65) Prior Publication Data

US 2021/0092112 A1 Mar. 25, 2021

(51) Int. Cl.
*H04L 9/40* (2022.01)

(52) U.S. Cl.
CPC .... *H04L 63/0853* (2013.01); *H04L 2463/082* (2013.01)

(58) Field of Classification Search
CPC ......... H04L 63/08; H04L 63/53; H04L 63/76; H04L 63/61; H04L 2463/082; H04L 9/08; H04L 9/66; H04L 9/72; H04L 9/3228; H04L 63/0853; H04L 63/0861; H04N 2201/3239; G06N 20/00; Y04S 40/18
See application file for complete search history.

(56) References Cited

U.S. PATENT DOCUMENTS

| | | | |
|---|---|---|---|
| 8,006,300 B2 | 8/2011 | Mizrah | |
| 8,533,791 B2 | 9/2013 | Samuelsson | |
| 8,683,586 B2 | 3/2014 | Crooks | |
| 8,719,106 B2 | 5/2014 | Bachenheimer | |
| 8,763,101 B2 | 6/2014 | Counterman | |

(Continued)

FOREIGN PATENT DOCUMENTS

| | | |
|---|---|---|
| CN | 106843774 B | 12/2017 |
| CN | 108629167 A | 10/2018 |
| CN | 112559987 A | 3/2021 |

OTHER PUBLICATIONS

Kerner, Sean Michael, "IBM Patents Browser-Based Fraud Detection Technology", Posted May 28, 2014, 5 pages, <https://www.esecurityplanet.com/browser-security/ibm-patents-browser-based-fraud-detection-technology.html>.

(Continued)

*Primary Examiner* — Chau Le
(74) *Attorney, Agent, or Firm* — Aaron N. Pontikos (57) ABSTRACT

Usage information of a user for a plurality of computing devices is identified. A usage pattern for each computing device of the plurality of computing devices of the user is developed based on the identified usage information of the user. An indication of the user accessing an application on a first computing device of the plurality of computing devices is received. The application requires one or more credentials for an authentication process associated with the application. A determination is made whether the user accessing the application using the first computing device is following the developed usage pattern of the user. Responsive to determining that the user accessing the application using the first computing device is not following developed usage pattern of the user, the authentication process associated with the application is interrupted.

20 Claims, 3 Drawing Sheets

(56) References Cited

U.S. PATENT DOCUMENTS

| | | |
|---|---|---|
| 9,172,546 B2 | 10/2015 | Friedl |
| 9,355,231 B2 | 5/2016 | Disraeli |
| 9,870,508 B1 | 1/2018 | Hodgson |
| 9,871,791 B2 | 1/2018 | Blinn |
| 10,057,255 B2 | 8/2018 | Votaw |
| 10,567,375 B1 * | 2/2020 | Mossler ............... H04L 63/083 |
| 2016/0066184 A1 | 3/2016 | Bhargav-Spantzel |
| 2016/0164866 A1 * | 6/2016 | Oberheide .......... H04L 63/0861 |
| 2017/0046799 A1 | 2/2017 | Chan |
| 2017/0236094 A1 | 8/2017 | Shah |
| 2018/0191701 A1 * | 7/2018 | Kong .................. H04L 63/083 |
| 2019/0080392 A1 | 3/2019 | Youb |
| 2019/0087844 A1 | 3/2019 | Leekley |
| 2019/0122155 A1 | 4/2019 | Irazabal |

OTHER PUBLICATIONS

Badreddin et al., "Blockchain Fundamentals and Development Platforms", CASCON '18: Proceedings of the 28th Annual International Conference on Computer Science and Software Engineering, Oct. 2018, pp. 377-379.

* cited by examiner

FIG. 3 though embodiments of the present invention may include vehicle-specific applications, it is contemplated that the present invention is not limited to vehicle-specific implementations.

MULTI-FACTOR AUTHENTICATION VIA MULTIPLE DEVICES

BACKGROUND

The present invention relates generally to the field of multi-factor authorization, and more particularly to providing multi-factor authorization with more than one computing device.

Today, accessing your bank via a website is but a few touches away when using a smartphone. Often, all that is required is a username and a password. Once a user submits those credentials, the user is "in" and has access to their bank just as if they were standing in front of a teller. Some banks require multi-factor authorization (MFA). Stated simply, MFA is an authentication method in which two or more pieces of "evidence" (or factors) are presented by a user to an authentication mechanism before the user is granted access. The factors include (i) knowledge, i.e., something the user, and only the user, knows; (ii) possession, e.g., something the user, and only the user, possesses; and (iii) inherence, i.e., something the user, and only the user, is.

SUMMARY OF THE INVENTION

Embodiments of the present invention include an approach for optimizing vehicle parking. In one embodiment, usage information of a user for a plurality of computing devices is identified. A usage pattern for each computing device of the plurality of computing devices of the user is developed based on the identified usage information of the user. An indication of the user accessing an application on a first computing device of the plurality of computing devices is received. The application requires one or more credentials for an authentication process associated with the application. A determination is made whether the user accessing the application using the first computing device is following the developed usage pattern of the user. Responsive to determining that the user accessing the application using the first computing device is not following developed usage pattern of the user, the authentication process associated with the application is interrupted.

DETAILED DESCRIPTION

Embodiments of the present invention recognize that security is paramount when using the Internet, especially when sensitive, personal information may be involved. Several highly public data breaches have occurred over the past few years; in said breaches, personal information such as dates of birth, addresses, social security numbers, and credit card numbers have been stolen. These data breaches have cost companies millions of dollars. In addition to financial costs, consumers have lost confidence in companies that have suffered data breaches. Further, data breaches can occur on a more personal level when personal data of a user is stolen. Finding ways to reduce, if not eliminate, data breaches affects virtually everyone with a smartphone.

Embodiments of the present invention recognize that there may be a method, computer program product, and computer system for providing multi-factor authorization with more than one computing device. In an embodiment, the method, computer program product, and computer system register a plurality of devices utilized by a user, learn habits of the user, and based on the habits of the user, develop a usage pattern for the user. Further, when abnormal usage is determined, the method, computer program product, and computer system is able to interrupt device usage and require usage of a new device for submitting a second factor credential prior to granting authorization to a website. The requirement of a new device helps to prevent fraudulent access to a website by, for example, an individual who has found a smartphone with cached credentials to a banking website. When the individual tries to access the bank website outside of the normal usage pattern of the smartphone owner, the method, computer program product, and computer system will require a second factor credential from some other computing device prior to granting access to the website.

References in the specification to "one embodiment", "an embodiment", "an example embodiment", etc., indicate that the embodiment described may include a particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention will now be described in detail with reference to the Figures.

Figure 1:
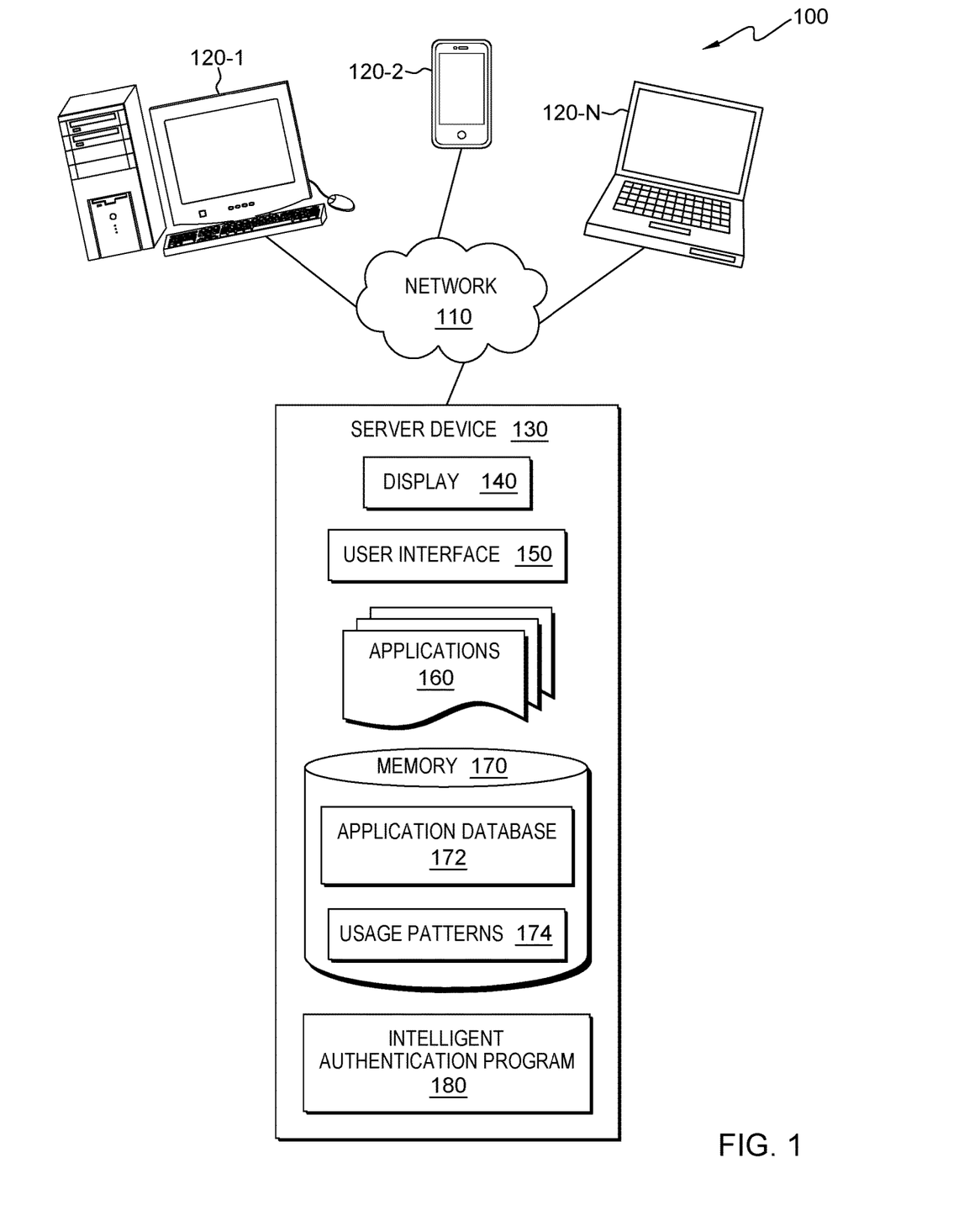
FIG. 1 depicts a functional block diagram of a computing environment, in accordance with an embodiment of the present invention.

FIG. 1 is a functional block diagram illustrating a computing environment, generally designated 100, in accordance with one embodiment of the present invention. FIG. 1 provides only an illustration of one implementation and does not imply any limitations with regard to the systems and environments in which different embodiments may be implemented. Many modifications to the depicted embodiment may be made by those skilled in the art without departing from the scope of the invention as recited by the claims.

In an embodiment, computing environment 100 includes computing device 120-1, computing device 120-2, computing device 120-N, and server device 130, interconnected by network 110. In example embodiments, computing environment 100 includes other computing devices (not shown in FIG. 1) such as smartwatches, cell phones, additional smartphones, wearable technology, phablets, tablet computers, additional laptop computers, additional desktop computers, other computer servers or any other computer system known in the art, interconnected with computing device 120-1, computing device 120-2, computing device 120-N, and server device 130 over network 110. For ease of reading, the term computing device 120-N will be used when discussing features of any of computing device 120-1, computing device 120-2, computing device 120-N.

In embodiments of the present invention, computing device 120-N and server device 130 are connected to network 110, which enables computing device 120-N and server device 130 to access other computing devices and/or data not directly stored on computing device 120-N and server device 130. Network 110 may be, for example, a short-range, low power wireless connection, a local area network (LAN), a telecommunications network, a wide area network (WAN) such as the Internet, or any combination of the three, and include wired, wireless, or fiber optic connections. In an embodiment, network 110 includes one or more wired and/or wireless networks that are capable of receiving and transmitting data, voice, and/or video signals, including multimedia signals that include voice, data, and video information. In general, network 110 is any combination of connections and protocols that will support communications between computing device 120-N and server device 130, and any other computing devices (not shown in FIG. 1) connected to network 110, in accordance with embodiments of the present invention. In an embodiment, data received by another computing device (not shown in FIG. 1) in computing environment 100 is communicated to computing device 120-N and server device 130 via network 110.

In embodiments of the present invention, computing device 120-N and server device 130 may be one of a laptop, tablet, or netbook personal computer (PC), a desktop computer, a personal digital assistant (PDA), a smartphone, a standard cell phone, a smartwatch or any other wearable technology, or any other hand-held, programmable electronic device capable of communicating with any other computing device within computing environment 100. According to embodiments, computing device 120 and server device 130 can be standalone computing devices, management servers, web servers, mobile computing devices, or any other electronic device or computing system capable of receiving, transmitting, and processing data. In other embodiments, computing device 120-N and server device 130 can represent computing systems utilizing multiple computers as a server system, such as in a cloud computing environment. In certain embodiments, computing device 120-N and server device 130 represent a computer system utilizing clustered computers and components (e.g., database server computers, application server computers, etc.) that act as a single pool of seamless resources when accessed by elements of computing environment 100. In general, computing device 120-N and server device 130 are representative of any electronic devices or combination of electronic devices capable of executing computer readable program instructions. In an embodiment, computing environment 100 includes any number of computing device 120-N and server device 130. Computing device 120-N and server device 130 may include internal and external hardware components as depicted and described in further detail with respect to FIG. 3, in accordance with embodiments of the present invention. Computing device 120-N and server device 130 may also include display 140, user interface (UI) 150, applications 160, memory 170, and intelligent authentication program 180.

According to an embodiment of the present invention, display 140 is an electronic visual device for a desktop computer, laptop computer, tablet computer, smartphone, smart-watch, and the like. Display 140 may include a touchscreen which is an input device layered on top of the display for allowing a user to control an electronic device via simple or multi-touch gestures by touching display 140 with a special stylus and/or one or more fingers. Display 140 displays user interface 150 as well as open programs and applications, allowing a user of server device 130 to interact with the open programs and applications via a keyboard and mouse (not shown in FIG. 1). Display 140 may be a thin film transistor liquid crystal display (TFT-LCD), a flat panel LED (light emitting diode) display, or a cathode ray tube (CRT). Display 140 may be connected to server device 130 via VGA (video graphics array), DVI (digital video interface), HDMI (High Definition Multi-Media Interface or any other connection type known in the art.

In an embodiment, user interface 150 provides an interface between a user computing device 120-N, server device 130, and intelligent authentication program 180. User interface 150 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 150 may also be mobile application software that provides an interface between a user computing device 120-N, server device 130, and intelligent authentication program 180. Mobile application software, or an "app," is a computer program designed to run on smartphones, tablet computers and other mobile devices. User interface 150 enables a user of server device 130 to interact with computing device 120-N, intelligent authentication program 180, and other computing device not shown in FIG. 1.

According to an embodiment of the present invention, applications 160 includes a plurality of applications which require at least one credential from a user to access. In an embodiment, examples of applications 150 include, but are not limited to, banking applications, medical portals, medical insurance applications, virtual private networks, shopping applications, government applications, social media applications, and the like. According to an embodiment of the present invention, the at least one credential from a user include, but are not limited to, a user identification (user ID), a password, a personal identification number (PIN), a software key, and the like.

In an embodiment, memory 170 is storage that is written to and/or read by intelligent authentication program 180, and any other programs and applications on computing device 120-N and server device 130. In one embodiment, memory 170 resides on server device 130. In other embodiments, memory 170 resides on computing device 120-N or any other device (not shown) in computing environment 100, in cloud storage or on another computing device accessible via network 110. In yet another embodiment, memory 170 represents multiple storage devices within server device 130. Memory 170 may be implemented using any volatile or non-volatile storage media for storing information, as known in the art. For example, memory 170 may be implemented with a tape library, optical library, one or more independent hard disk drives, multiple hard disk drives in a redundant array of independent disks (RAID), solid-state drives (SSD), or random-access memory (RAM). Similarly, memory 170 may be implemented with any suitable storage architecture known in the art, such as a relational database, an object-oriented database, or one or more tables. In an embodiment of the present invention, intelligent authentication program 180, and any other programs and applications (not shown in FIG. 1) operating on server device 130 may store, read, modify, or write data to memory 170. In an embodiment of the present invention, data stored to memory 170 includes, but is not limited to, data stored to application database 172 and usage patterns 174.

According to embodiments of the present invention, application database 172 is a memory location within memory 170 where specific information concerning each application in the plurality of applications 160 is stored. In an embodiment, examples of information stored to application database 172 includes, but is not limited to, user information such as names, credentials, and device registration information for the users of one or more of applications 160.

In an embodiment, usage patterns 174 is a memory location within memory 170 where usage history information for individual users of at least one application in applications 160 is stored. According to an embodiment, based on the usage history information, intelligent authentication program 180 can develop a unique usage pattern for each individual user; each developed usage pattern is also stored to usage patterns 174. Usage patterns stored to usage patterns 174 may include information such as when (e.g., time of day, specific day(s), etc.) a user accesses a certain application, what device (e.g., a smartphone, a laptop computer, a desktop computer, a smart-watch, etc.) is utilized by the user to access said application, and a location (e.g., a home location, a work location, a global positioning system (GPS) location, etc.) where the user normally access said website.

According to an embodiment of the present invention, intelligent authentication program 180 can be a program, a subprogram of a larger program, an application, a plurality of applications, or mobile application software, which functions to provide multi-factor authorization with more than one computing device. A program is a sequence of instructions written by a programmer to perform a specific task. In an embodiment, intelligent authentication program 180 runs by itself. In other embodiments, intelligent authentication program 180 depends on system software (not shown in FIG. 1) to execute. In one embodiment, intelligent authentication program 180 functions as a stand-alone program residing on server device 130. In another embodiment, intelligent authentication program 180 works in conjunction with other programs, applications, etc., found in computing environment 100. In yet another embodiment, intelligent authentication program 180 resides on computing device 120-N. In yet another embodiment, intelligent authentication program 180 resides on other computing devices (not shown in FIG. 1) in computing environment 100, which are interconnected to computing device 120-N and server device 130 via network 110.

In an embodiment, intelligent authentication program 180 develops a usage pattern of a user accessing a plurality of applications based on the history of the user. In the embodiment, when abnormal usage of the user accessing an application is determined, intelligent authentication program 180 interrupts authentication of the user for the application. Further in the embodiment, intelligent authentication program 180 determines whether the user has input authentication information for the application via a new computing device. Based on the determination, intelligent authentication program 180 may (i) process the authentication or (ii) transmit a notification to the user.

Figure 2:
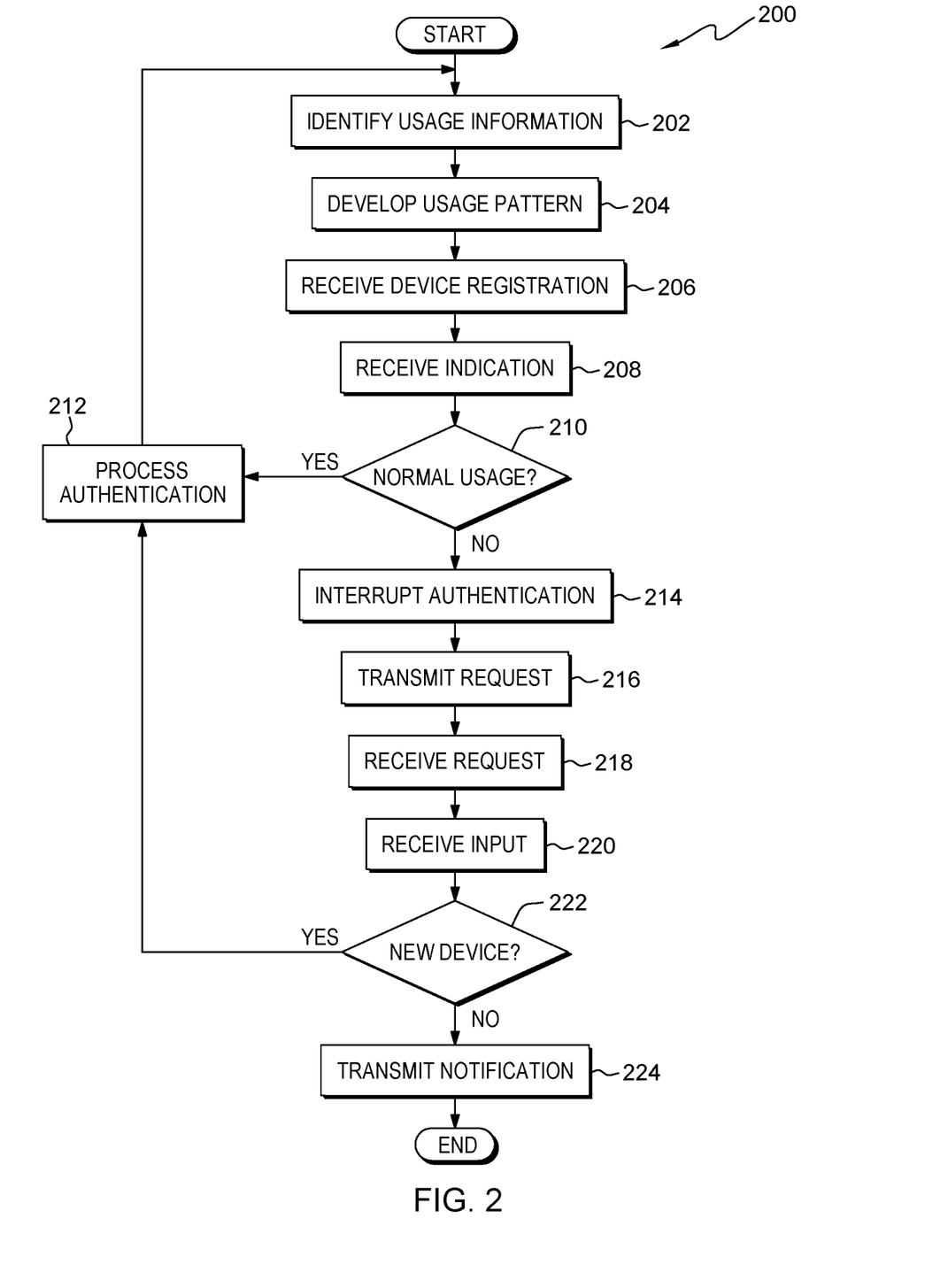
FIG. 2 depicts a flowchart of a program for providing multi-factor authorization with more than one computing device, in accordance with an embodiment of the present invention.

FIG. 2 is a flowchart of workflow 200 depicting a method for providing multi-factor authorization with more than one computing device. In one embodiment, the method of workflow 200 is performed by intelligent authentication program 180. In an alternative embodiment, the method of workflow 200 is performed by any other program working with intelligent authentication program 180. In an embodiment, a user, via user interface 150, invokes workflow 200 upon providing credentials to a website. In an alternative embodiment, a user invokes workflow 200 upon accessing intelligent authentication program 180 on server device 130 via network 110.

In an embodiment, intelligent authentication program 180 identifies usage information (step 202). In other words, intelligent authentication program 180 identifies how a user accesses the Internet and which websites that require authorization to access are utilized by the user. According to an embodiment, intelligent authentication program 180 monitors the user as the user connects to the Internet to identify the websites visited by the user. In an embodiment, intelligent authentication program 180 identifies usage information of a user of computing device 120-N as the user accesses applications 160 on server device 130 via network 110 over the Internet. For example, a program on a smartphone owned by Ann identifies website usage of Ann as Ann accesses the following three websites on the Internet which require an authorization to fully utilize: (i) her credit union; (ii) the application of her medical insurance company; and (iii) her account for a large online retailer. The program, also found on a laptop computer and a desktop computer used by Ann, also identifies usage by Ann of the laptop computer and the desktop computer.

According to an embodiment of the present invention, intelligent authentication program 180 develops usage pattern (step 204). In other words, intelligent authentication program 180 builds a history of the usage information of the user over a period of time. In an embodiment, the period of time is determined by intelligent authentication program 180. In another embodiment, the period of time is determined by the user. In yet another embodiment, the period of time is determined by the number of website accesses by the user. According to an embodiment, intelligent authentication program 180 develops a usage pattern of a user by analyzing via machine learning algorithms the monitored usage information of the user based on the history of the user. In an embodiment, intelligent authentication program 180 monitors website usage of a user of computing device 120-N as the user accesses the Internet via network 110. Based on the website usage for the user, intelligent authentication program 180 develops a usage pattern for the user. For example, over the course of three months, Ann has the following website usage for the three websites on the three different computing devices: (i) Ann accesses the credit union website on a smartphone and a desktop computer on any day of the week, at any location, and at any time of the day; (ii) Ann accesses the application of her medical insurance company every Friday after work at home using only a laptop computer; and (iii) Ann accesses the website of the online retailer on a laptop and a desktop computer approximately twice during the work week (always after work and at home) and on the laptop, desktop computer, and smartphone during the weekends (any time of the day or night at any location).

In an embodiment, intelligent authentication program 180 receives device registration (step 206). In other words, intelligent authentication program 180 receives information from the user regarding the computing devices utilized by the user. According to an embodiment, intelligent authentication program 180 receives the device registration information directly from the user. According to another embodiment, intelligent authentication program 180 receives the device registration information directly from the computing devices. According to yet another embodiment, intelligent authentication program 180 receives the device registration information by determining the device information during the timeframe that intelligent authentication program 180 is identifying usage information about the user. In an embodiment, example device registration information includes, but is not limited to a media access control (MAC) address, a universally unique identification (UUID), a transmission control protocol/Internet protocol (TCP/IP), and the like. In an embodiment, the user of computing device 120-N submits device registration information about a plurality of computing device 120-N utilized by the user to intelligent authentication program 180 on server device 130 via network 110. For example, Ann provides the following device registration information to the program on the smartphone used by Ann: (i) the MAC address for the desktop computer used by Ann is 00:0d:83:b1:c0:8e and (ii) the MAC address for the laptop used by Ann is 00:A0:C9:14:C8:29. The program on the smartphone is able to directly determine that the MAC address of the smartphone is 00:D1:77:a2:01:6b.

According to an embodiment of the present invention, intelligent authentication program 180 receives an indication (step 208). In other words, intelligent authentication program 180 receives an indication that a user is accessing a website on the Internet that requires one or more authorization credentials in order to fully access. In an embodiment, intelligent authentication program 180 receives an indication over network 110 that a user of computing device 120-N is attempting to access one of applications 160 on server device 130. For example, the program on the desktop computer used by Ann receives an indication that Ann is accessing her medical insurance company on Thursday evening using her desktop computer.

In an embodiment, intelligent authentication program 180 determines whether usage is normal (decision step 210). In other words, intelligent authentication program 180 determines whether the indicated computing device is normal (i.e., fits the developed usage pattern for the user). In an embodiment, intelligent authentication program 180 makes the determination by comparing the circumstances of the indicated usage to the developed usage pattern of the user. In one embodiment (decision step 210, YES branch), intelligent authentication program 180 determines that the indicated usage is normal; therefore, intelligent authentication program 180 proceeds to step 212 to process the authentication for accessing the website. In the embodiment (decision step 210, NO branch), intelligent authentication program 180 determines that the indicated usage is not normal; therefore, intelligent authentication program 180 proceeds to step 214 to interrupt the authentication process for the website.

According to an embodiment of the present invention, intelligent authentication program 180 processes authentication (step 212). In other words, responsive to determining that the indicated usage is normal, intelligent authentication program 180 processes the authorization for accessing the website. In an embodiment, the user submits one or more authentication credentials (such as in the case of multi-factor authentication) for accessing the website and intelligent authentication program 180 allows the credentials to reach the application for verification. In the embodiment, when the credentials are correct, the user is granted access to the website or the user is requested to submit a multi-factor authorization. Further in the embodiment, when the credentials are not correct, a notification is sent to the user from the website indicating that the wrong credentials were submitted. According to an embodiment, intelligent authentication program 180 allows the credentials submitted by a user of computing device 120-N over network 110 to reach the specific application of applications 160 on server device 130 for verification. For example, if normal usage had been determined for Ann (e.g., Ann was accessing the medical insurance company application using her registered laptop on Friday evening), the program on the laptop used by Ann would allow the submitted credentials from Ann to reach the application of the medical insurance company.

In an embodiment, intelligent authentication program 180 interrupts authentication (step 214). In other words, responsive to determining that the indicated usage is not normal, intelligent authentication program 180 interrupts the website access of the user by preventing the credentials submitted by the user from reaching the application. According to an embodiment of the present invention, intelligent authentication program 180 determines whether the initial credential to access the website is correct; when the credential is correct, intelligent authentication program 180 stores the proper access for later use. When the credential is not correct, intelligent authentication program 180 notifies the user of an incorrect credential. In an embodiment, intelligent authentication program 180 prevents the credentials submitted by the user of computing device 120-N from reaching the specific application of applications 160 on server device 130 from reaching the specific application over network 110. For example, the developed usage pattern for Ann shows that Ann accesses the medical insurance company application on Friday after work using a laptop computer. Because the current instance of Ann accessing the application is not normal (i.e., Ann is attempting to access the application on Thursday evening using her desktop computer), the program on the desktop computer used by Ann prevents the credentials submitted by Ann from reaching the medical insurance company application.

According to an embodiment of the present invention, intelligent authentication program 180 transmits request (step 216). In other words, responsive to interrupting the authentication process for accessing the website, intelligent authentication program 180 transmits a request to the server device hosting the application requesting an intelligent authentication be performed for granting access to the website. In an embodiment, an intelligent authentication requires that a second factor access code, or other credential, be submitted from a different computing device when compared to the computing device used to initially submit the original credentials for accessing the website. In an embodiment, intelligent authentication program 180 transmits a request for intelligent authentication using network 110 to server device 130 which is hosting applications 160. For example, the program on the desktop computer used by Ann transmits a request to the server hosting the medical insurance company application requesting intelligent authentication for granting access to the application to Ann.

In an embodiment, intelligent authentication program 180 receives request (step 218). In other words, intelligent authentication program 180 receives a request from the server hosting the application being accessed by the user. According to an embodiment, the request is for an intelligent authentication and the request is received on a different registered device of the user from the original computing device used to initially attempt access. Also, according to the embodiment the received request includes a second factor credential, such as a six-character alphanumeric code, that the user will be required to submit from another registered computing device as part of the intelligent authentication prior to access being granted to the website or application. In an embodiment, the request can be in the form of a text message (either short message service or multimedia messages) or an e-mail (where, in one example, opening the e-mail triggers an action to add the MAC address of the computing device used to open the e-mail to the supplied second factor credential thereby ensuring a different computing device is used since intelligent authentication program 180 knows the MAC address of the original computing device). According to an embodiment, intelligent authentication program 180 receives a request for intelligent authentication over network 110 from server device 130 which hosts applications 160 and the request includes a multi-factor code. For example, the program on the desktop computer used by Ann receives an e-mail request that Ann follow intelligent authentication to access the medical insurance company application. Further in the example, the request includes a second factor authorization code of "IA-ANN-HbD7OPx8".

According to an embodiment, intelligent authentication program 180 receives input (step 220). In other words, responsive to receiving the request for intelligent authentication, intelligent authentication program 180 receives an input from the user attempting to access the website and the input includes a multi-factor code. In an embodiment, the input is received from the same computing device and includes the correct multi-factor code. In another embodiment, the input is received from a different computing device and includes the correct multi-factor code. In yet another embodiment, if an incorrect multi-factor code is submitted, website access is not granted regardless of the computing device used by the user. According to an embodiment of the present invention, intelligent authentication program 180 on server device 130 receives an input from the user of computing device 120-N over network 110; included in the input is a multi-factor code. For example, Ann submits the multi-factor code "IA-ANN-HbD7OPx8" using her smartphone rather than her desktop computer.

In an embodiment, intelligent authentication program 180 determines whether a new device is used (decision step 222). In other words, responsive to receiving the input from the user, including a multi-factor code, intelligent authentication program 180 determines whether the input was transmitted from a new device. According to an embodiment of the present invention, intelligent authentication program 180 makes the determination by ensuring that the registration information of the original computing device (e.g., a desktop computer) is different from the registration information of the computing device used to transmit the input (e.g., a smartphone). In one embodiment (decision step 222, YES branch), intelligent authentication program 180 determines that the computing device is different (i.e., a new device is used); therefore, intelligent authentication program 180 returns to step 212 to process the authentication. In the embodiment (decision step 222, NO branch), intelligent authentication program 180 determines that the computing device is not different (i.e., a new device was not used); intelligent authentication program 180 proceeds to step 224 to transmit a notification to the user.

According to an embodiment, intelligent authentication program 180 transmits notification. In other words, responsive to determining that a new (i.e., different) computing device was not used, intelligent authentication program 180 transmits a first notification to the user which includes a comment that the user is required to re-submit the multi-factor code using a different computing device in order to be granted access to the website. In a first embodiment, if the multi-factor code is resubmitted and intelligent authentication program 180 determines that the multi-factor code was re-submitted using a new computing device, intelligent authentication program 180 will return to step 212 to process the authentication. In a second embodiment, if the multi-factor code is resubmitted and intelligent authentication program 180 determines that the multi-factor code was not re-submitted using a new computing device, intelligent authentication program 180 closes the application or website the user is attempting to access as the attempted access may be fraudulent. In the second embodiment, intelligent authentication program 180 may transmit a notification to (i) the preferred computing device of the user (which was indicated by the user during the device registration process) or to (ii) all of the registered computing devices registered by the user; the notification may contain a fraudulent activity notification associated with at least one computing device of the plurality of the computing devices. According to an embodiment of the present invention, intelligent authentication program 180 transmits a notification over network 110 to the user of computing device 120-N notifying the user to re-submit the multi-factor code with a different computing device 120-N. For example, since Ann submitted the multi-factor code "IA-ANN-HbD7OPx8" from her smartphone, the program determines, based on a MAC address comparison, that the smartphone is a new computing device and not the desktop computer. Therefore, Ann is granted access to the medical insurance company application and a first notification is not sent to Ann.

In a new example, if Ann had transmitted the multi-factor code "IA-ANN-HbD7OPx8" from her desktop computer, Ann would have received a first notification indicating that Ann should re-submit the multi-factor code using a different computing device. In a first scenario of the new example, if Ann assumes she had simply typed the multi-factor code incorrectly and re-submits it using the desktop computer again, all of the registered computing devices owned by Ann would receive a second notification indicating that access to the medical insurance company application has been denied and that sensitive personal information of Ann may be compromised. In a second scenario of the new example, if Ann realizes that the multi-factor code should be re-submitted on a different computing device and Ann re-submits "IA-ANN-HbD7OPx8" using the registered laptop, Ann would be granted access to the medical insurance company application and would not receive the second notification.

Figure 3:
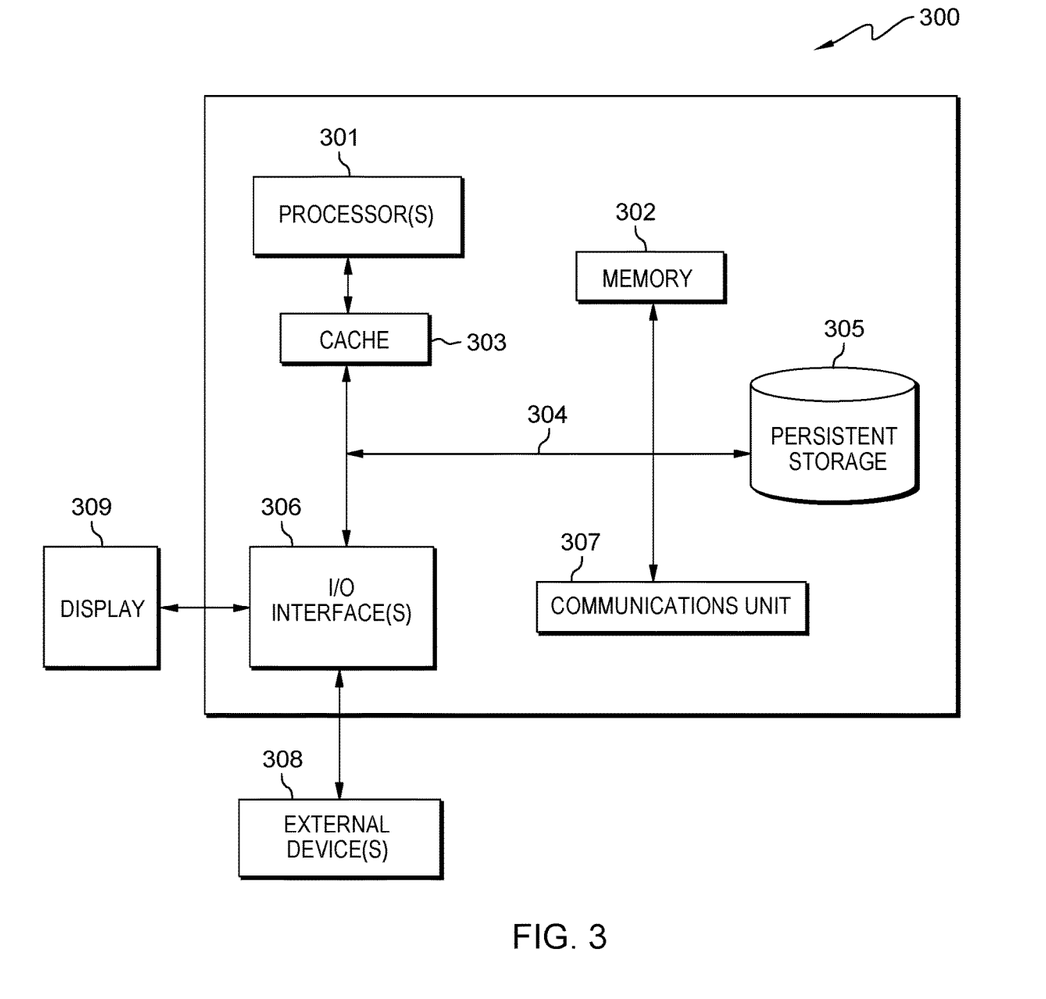
FIG. 3 depicts a block diagram of components of the computing environment of FIG. 1, in accordance with an embodiment of the present invention.

FIG. 3 depicts computer system 300, which is an example of a system that includes intelligent authentication program 180. Computer system 300 includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method, the method comprising:
    identifying, by one or more computer processors, usage information of a user for a plurality of computing devices;
    developing, by one or more computer processors, a usage pattern for each computing device of the plurality of computing devices of the user based on the identified usage information of the user;
    receiving, by one or more computer processors, an indication of the user accessing an application on a first computing device of the plurality of computing devices, wherein the application requires one or more credentials for an authentication process associated with the application;
    determining, by one or more computer processors, whether the user accessing the application on the first computing device is following the developed usage pattern of the user;
    responsive to determining that the user accessing the application on the first computing device is not following the developed usage pattern of the user, interrupting, by one or more computer processors, the authentication process associated with the application, wherein interrupting the authentication process associated with the application includes preventing access credentials submitted by the user from reaching the application; and
    responsive to interrupting the authentication process associated with the application, transmitting, by one or more computer processors, a first request to a server device hosting the application, wherein the first request includes an instruction for a multi-factor authentication.

2. The method of claim 1, further comprising:
    responsive to determining that the user accessing the application on the first computing device is following the developed usage pattern of the user, processing, by one or more computer processors, the authentication process associated with the application.

3. The method of claim 1, further comprising:
    receiving, by one or more computer processors, a second request from the server device hosting the application to the user, wherein the second request includes a requirement for the user to provide the multi-factor authentication using a computing device of the plurality of computing devices that is a different computing device from the first computing device;
    receiving, by one or more computer processors, a first input from the user that includes the multi-factor authentication;
    determining, by one or more computer processors, whether the received first input was transmitted using the different computing device; and
    responsive to determining that the received first input was not transmitted using the different computing device, transmitting, by one or more computer processors, a first notification to the user that includes a request to re-submit the multi-factor authentication from the different computing device.

4. The method of claim 3, further comprising:
    responsive to transmitting the first notification to the user, receiving, by one or more computer processors, a second input from the user that includes the multi-factor authentication;
    determining, by one or more computer processors, whether the received second input was transmitted using the different computing device; and
    responsive to determining that the received second input was not transmitted using the different computing device, transmitting, by one or more computer processors, a second notification to the user, wherein the second notification to the user includes a first comment to the user that the user has been denied access to the application and that the application has been closed and a second comment to the user that contains a fraudulent activity notification associated with at least one computing device of the plurality of the computing devices.

5. The method of claim 3, further comprising:
    responsive to determining that the received first input was transmitted using the different computing device, processing, by one or more computer processors, the authentication process associated with the application.

6. The method of claim 4, further comprising:
    responsive to determining that the received second input was transmitted using the different computing device, processing, by one or more computer processors, the authentication process associated with the application.

7. The method of claim 1, wherein the step of developing, by one or more computer processors, a usage pattern for the plurality of computing devices of the user based on the identified usage information of the user, comprises:

monitoring, by one or more computer processors, usage for each computing device of the plurality of computing devices of the user over a period of time;

analyzing, by one or more computer processors, using a plurality of machine learning algorithms, the monitored usage of each computing device of the plurality of computing devices of the user; and developing, by one or more computer processors, the usage pattern for each computing device of the plurality of computing devices of the user, wherein the usage pattern includes one or more usage factors.

8. The method of claim 7, wherein the one or more usage factors include a specific computing device of the plurality of computing devices, a specific application accessed by the user, a location of the user, a time of day, and a day of week.

9. A computer program product, the computer program product comprising:

one or more computer readable storage media; and program instructions stored on the one or more computer readable storage media, the program instructions comprising:

program instructions to identify usage information of a user for a plurality of computing devices;

program instructions to develop a usage pattern for each computing device of the plurality of computing devices of the user based on the identified usage information of the user;

program instructions to receive an indication of the user accessing an application on a first computing device of the plurality of computing devices, wherein the application requires one or more credentials for an authentication process associated with the application;

program instructions to determine whether the user accessing the application on the first computing device is following the developed usage pattern of the user;

responsive to determining that the user accessing the application on the first computing device is not following the developed usage pattern of the user, program instructions to interrupt the authentication process associated with the application computer processors, the authentication process associated with the application, wherein interrupting the authentication process associated with the application includes preventing access credentials submitted by the user from reaching the application; and responsive to interrupting the authentication process associated with the application, transmitting, by one or more computer processors, program instructions to transmit a first request to a server device hosting the application, wherein the first request includes an instruction for a multi-factor authentication.

10. The computer program product of claim 9, further comprising program instructions stored on the one or more computer readable storage media, to:

responsive to determining that the user accessing the application on the first computing device is following the developed usage pattern of the user, process the authentication process associated with the application.

11. The computer program product of claim 9, further comprising program instructions stored on the one or more computer readable storage media, to:

receive a second request from the server device hosting the application to the user, wherein the second request includes a requirement for the user to provide the multi-factor authentication using a computing device of the plurality of computing devices that is a different computing device from the first computing device;

receive a first input from the user that includes the multi-factor authentication;

determine whether the received first input was transmitted using the different computing device; and responsive to determining that the received first input was not transmitted using the different computing device, transmit a first notification to the user that includes a request to re-submit the multi-factor authentication from the different computing device.

12. The computer program product of claim 11, further comprising program instructions stored on the one or more computer readable storage media, to:

responsive to transmitting the first notification to the user, receive a second input from the user that includes the multi-factor authentication;

determine whether the received second input was transmitted using the different computing device; and responsive to determining that the received second input was not transmitted using the different computing device, transmit a second notification to the user, wherein the second notification to the user includes a first comment to the user that the user has been denied access to the application and that the application has been closed and a second comment to the user that contains a fraudulent activity notification associated with at least one computing device of the plurality of the computing devices.

13. The computer program product of claim 12, further comprising program instructions stored on the one or more computer readable storage media, to:

responsive to determining that the received second input was transmitted using the different computing device, process the authentication process associated with the application.

14. The computer program product of claim 11, further comprising program instructions stored on the one or more computer readable storage media, to:

responsive to determining that the received first input was transmitted using the different computing device, process the authentication process associated with the application.

15. The computer program product of claim 9, wherein the program instructions to develop a usage pattern for the plurality of computing devices of the user based on the identified usage information of the user, comprises:

program instructions to monitor usage for each computing device of the plurality of computing devices of the user over a period of time;

program instructions to analyze using a plurality of machine learning algorithms, the monitored usage of each computing device of the plurality of computing devices of the user; and program instructions to develop the usage pattern for each computing device of the plurality of computing devices of the user, wherein the usage pattern includes one or more usage factors.

16. The computer program product of claim 15, wherein the one or more usage factors include a specific computing device of the plurality of computing devices, a specific application accessed by the user, a location of the user, a time of day, and a day of week.

17. A computer system, the computer system comprising:
one or more computer processors;
one or more computer readable storage media; and program instructions stored on the one or more computer readable storage media for execution by at least one of the one or more computer processors, the program instructions comprising:
- program instructions to identify usage information of a user for a plurality of computing devices;
- program instructions to develop a usage pattern for each computing device of the plurality of computing devices of the user based on the identified usage information of the user;
- program instructions to receive an indication of the user accessing an application on a first computing device of the plurality of computing devices, wherein the application requires one or more credentials for an authentication process associated with the application;
- program instructions to determine whether the user accessing the application on the first computing device is following the developed usage pattern of the user;
- responsive to determining that the user accessing the application on the first computing device is not following the developed usage pattern of the user, program instructions to interrupt the authentication process associated with the application, wherein interrupting the authentication process associated with the application includes preventing access credentials submitted by the user from reaching the application; and
- responsive to interrupting the authentication process associated with the application, transmitting, by one or more computer processors, program instructions to transmit a first request to a server device hosting the application, wherein the first request includes an instruction for a multi-factor authentication.

18. The computer system of claim 17, further comprising program instructions stored on the one or more computer readable storage media for execution by at least one of the one or more computer processors, to:
- responsive to determining that the user accessing the application on the first computing device is following the developed usage pattern of the user, process the authentication process associated with the application.

19. The computer system of claim 17, further comprising program instructions stored on the one or more computer readable storage media for execution by at least one of the one or more computer processors, to:
- receive a second request from the server device hosting the application to the user, wherein the second request includes a requirement for the user to provide the multi-factor authentication using a computing device of the plurality of computing devices that is a different computing device from the first computing device;
- receive a first input from the user that includes the multi-factor authentication;
- determine whether the received first input was transmitted using the different computing device; and
- responsive to determining that the received first input was not transmitted using the different computing device, transmit a first notification to the user that includes a request to re-submit the multi-factor authentication from the different computing device.

20. The computer system of claim 19, further comprising program instructions stored on the one or more computer readable storage media for execution by at least one of the one or more computer processors, to:
- responsive to transmitting the first notification to the user, receive a second input from the user that includes the multi-factor authentication;
- determine whether the received second input was transmitted using the different computing device; and
- responsive to determining that the received second input was not transmitted using the different computing device, transmit a second notification to the user, wherein the second notification to the user includes a first comment to the user that the user has been denied access to the application and that the application has been closed and a second comment to the user that contains a fraudulent activity notification associated with at least one computing device of the plurality of the computing devices.

* * * * *